UNITED STATES PATENT OFFICE 2,514,004

3-MONOCARBOXYLIC ACIDS-2-THIONO-THIAZINES AND THEIR PRODUCTION

Roger A. Mathes and Floyd D. Stewart, Akron, Ohio, assignors to The B. F. Goodrich Company, New York, N. Y., a corporation of New York No Drawing. Application September 24, 1949, Serial No. 117,737

5 Claims. (Cl. 260—243)

This invention relates to 3-substituted 2-thiono-thiazines and pertains more specifically to 2-thiono-thiazines having the residue of a monocarboxylic acid or its ester attached by a carbon atom apart from its functional group to the nitrogen atom in the 3 position of the thiazine ring. The invention also includes the method of making these 3-substituted 2-thiono-thiazines.

The 3-substituted 2-thiono-thiazines of this invention possess the following general formula:

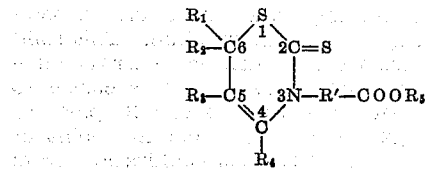

where each of $R_1$, $R_2$, $R_3$, $R_4$ and $R_5$ is hydrogen or a hydrocarbon group and $R'$ is a divalent hydrocarbon radical. These compounds will sometimes be referred to hereinafter as "2-thiono-thiazine-3-monocarboxylic acids and esters." They are useful as intermediates in the synthesis of organic compounds, in the compounding of natural and synthetic rubbers and resins, and as insecticides, fungicides and regulators for plant growth.

These 2-thiono-thiazine - 3 - monocarboxylic acids and esters are prepared by reacting an alpha, beta-olefinically-unsaturated aldehyde or ketone, that is, an aldehyde or ketone containing the structure

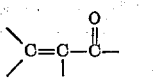

with a dithiocarbamic acid derived from a primary-amino-substituted monocarboxylic acid or ester thereof. This reaction proceeds as follows:

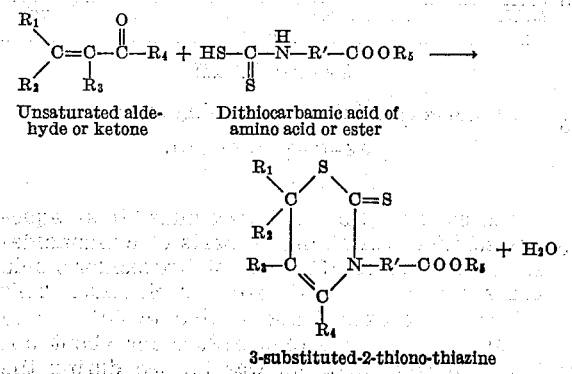

3-substituted-2-thiono-thiazine where $R_1$, $R_2$, $R_3$, $R_4$, $R_5$ and $R'$ have the significance as indicated above.

The dithiocarbamic acid employed as a reactant is preferably generated in situ, because of the general instability of free dithiocarbamic acids. This is conveniently accomplished by adding a salt of the dithiocarbamic acid to an acid solution or suspension of the unsaturated ketone or aldehyde. The dithiocarbamic acid salts so used are, in turn, first prepared preferably by reacting the amino acid or ester with carbon disulfide, generally in an alkaline medium. The following equation illustrates this reaction when carried out in the presence of sodium hydroxide where the sodium salt of the dithiocarbamic acid is formed:

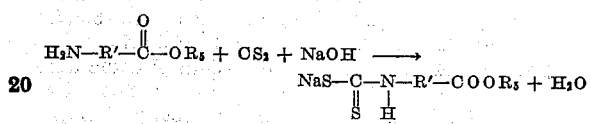

Again, $R'$ and $R_5$ have the significance indicated above.

Among the unsaturated aldehydes containing the group

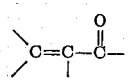

which will react with the dithiocarbamic acids of amino acids and esters of amino acids to give the 3-substituted 2-thiono-thiazines of this invention, are acrolein, methacrolein, tiglic aldehyde, 2-ethyl-2-hexenal, crotonaldehyde, cinnamaldehyde, alpha-ethyl acrolein, alpha-methyl-beta-ethyl acrolein, alpha-propyl acrolein, alpha-isobutyl acrolein, and the like.

Representative examples of the alpha,beta-olefinically-unsaturated ketones, which likewise may be employed as reactants in the preparation of the 3-substituted 2-thiono-thiazines of this invention, include, among others, mesityl oxide, phorone, ethylidene acetone, isobutylidene acetone, butylidene acetone, heptylidene acetone, 5-methyl-4-heptene-one-3, 5-ethyl-3-heptene-one-2, 5-ethyl-3-nonene-one-2, 3-methyl-4-ethyl-3-hexene-one-2, propyl propenyl ketone, vinyl methyl ketone, vinyl ethyl ketone, phenyl vinyl ketone, chalcone, acrylonaphthone, benzilidene acetone, 4-phenyl-3-butene-one-2, styryl ketone, and styryl n-hexyl ketone.

The preferred alpha,beta unsaturated aldehydes and alpha,beta unsaturated ketones for use in this invention are those which possess the formula set forth above wherein each of $R_1$, $R_2$ and $R_3$ is hydrogen or a hydrocarbon radical containing 1 to 6 carbon atoms and wherein $R_4$ is hydrogen, in the case of aldehydes, or is a hydrocarbon radical having 1 to 6 carbon atoms, in the case of ketones.

The other reactant employed in the process of this invention is the dithiocarbamic acid of any amino acid or hydrocarbon ester thereof having the formula as hereinbefore set forth. For example, this includes the dithiocarbamic acids of such amino acids as glycine, alpha-alanine, beta-alanine, amino sec-butyl acetic acid (isoleucine) 4-amino-butyric acid, 1-amino butyric acid, 2-amino butyric acid, 2-amino-1,1-diethyl butyric acid, 1-amino 2,2-dimethyl butyric acid, 3-amino-2,3 - diphenyl butyric acid, 1-amino - 1 - ethyl butyric acid, 1-amino 1-methyl butyric acid (isovaline), 1-amino - 1 - phenyl butyric acid, 3 - (o - aminophenyl) butyric acid, 1 - amino caproic acid, 4-amino caproic acid, 5-amino-2,4-dimethyl caproic acid, 5-amino caproic acid, 2 - amino - 2 - methyl caproic acid, 5 - amino-3-methyl caproic acid, 1-amino caprylic acid, 5-amino-3,4,4-trimethyl caprylic acid, 1-amino capric acid, 2-amino capric acid, alpha-amino cyclohexaneacetic acid, 4-amino cyclohexane-acetic acid, 2-amino cyclohexanecarboxylic acid, p-amino benzoic acid, 3-amino-4-ethyl-benzoic acid, p-(2-aminopropyl) benzoic acid, p-(2-aminoethyl) benzoic acid, p-(3-aminopropyl) benzoic acid, m-aminobenzoic acid, m-(p-aminophenyl) benzoic acid, 4-amino-2-phenyl benzoic acid, o-(p-aminophenyl) benzoic acid, anthranilic acid, 3,5-dimethyl anthranilic acid, 3,6-dimethyl anthranilic acid, 5-phenyl anthranilic acid, 3-amino-2-anthroic acid, 2-amino-1-naphthoic acid, 3-amino-1-naphthoic acid, 6-amino-1-naphthoic acid, 8-amino-1-naphthoic acid, 2-amino-5,6,7,8-tetrahydronaphthoic acid, 4-amino-5,6,7,8-tetrahydronaphthoic acid, 1-amino-2-naphthoic acid, 3-amino-2-naphthoic acid, 1-amino-3-methyl-2 - naphthoic acid, 1-amino-6-methyl-2-naphthoic acid, 1 - amino - 7 - methyl naphthoic acid, 1 - amino - 5,6,7,8-tetrahydronaphthoic acid and 3 - amino - 5,6,7,8-tetrahydronaphthoic acid. The hydrocarbon esters of these amino acids which are useful reactants in preparing these new 3-substituted-2-thiono-thiazines include the alkyl esters such as the methyl, ethyl, isopropyl and isobutyl esters; the cycloalkyl esters such as the cyclohexyl esters; the aryl esters such as the phenyl and naphthyl esters; and the aralkyl esters such as the benzyl and phenethyl esters.

The following are specific examples of dithiocarbamic acid a few of the easily obtainable and preferred amino acids set forth above: dithiocarbamic acid of glycine,

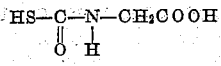

dithiocarbamic acid of beta alanine,

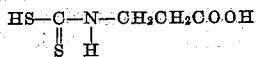

dithiocarbamic acid of alpha alanine,

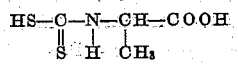

and dithiocarbamic acid of p-amino benzoic acid,

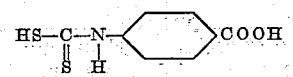

The preparation of the sodium dithiocarbamate salt of glycine set forth in Example I illustrates the method of obtaining the reactant required for the preparation of the 3-substituted-2-thiono-thiazines of this invention. In Example I all parts are by weight.

EXAMPLE I

To an aqueous solution containing 40 parts of sodium hydroxide dissolved in 200 parts of water there was added 37.5 parts of glycine (amino acetic acid). This mixture was stirred and cooled to 20° C. Then 38.0 parts of carbon disulfide were added to the mixture. The reaction mixture was maintained at 20° C. and was stirred for about 2 hours at which time the reaction was complete as evidenced by the disappearance of the carbon disulfide layer. In this manner a solution containing 82 parts of a

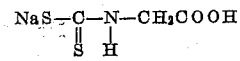

was prepared.

The following specifically detailed examples illustrate the preparation of the 3-substituted 2-thiono-thiazines of this invention. Again all parts are by weight.

EXAMPLE II

The aqueous solution of the sodium dithiocarbamate salt of glycine prepared in Example I was added with vigorous stirring to a solution containing 49 parts of mesityl oxide dissolved in 198 parts of hydrochloric acid containing 37 parts of hydrogen chloride. This mixture was stirred and heated to 60° C. and maintained at that temperature for about one hour. A solid material formed during the reaction. This solid material was recovered by filtration after the mixture resulting from the reaction was cooled to room temperature. In this manner 28 parts of a solid product, which had a melting point of 157° C. to 159° C. after recrystallization from ethanol, were recovered. This product was identified as 4,6,6-trimethyl-2-thiono-3,6-dihydro-thiazine-3-acetic acid having the formula

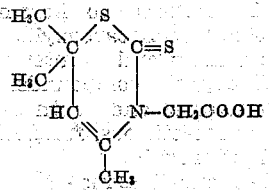

The chemical analysis of the product prepared is in agreement with the calculated chemical composition as indicated below.

*Percentage composition*

| | Calculated | | By Analysis |
|---|---|---|---|
| C | 46.73 | C | 46.74 |
| H | 5.66 | H | 5.68 |
| N | 6.06 | N | 6.05 |
| S | 27.72 | S | 27.76 |
| M. W | 231 | M. W | 232 |

EXAMPLE III

An aqueous solution containing 82 parts of

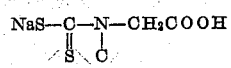

prepared as in Example I were added to an aqueous solution containing 66 parts of cinnamaldehyde dissolved in 198 parts of hydrochloric acid containing 37 parts of hydrogen chloride. This mixture was stirred and heated to 60° C. and maintained at that temperature for about one hour. A solid material was formed during the reaction. After cooling the solid reaction product was recovered by filtration. In this manner a yield of 110 parts of the solid reaction product, which was identified as 6-phenyl-2-thiono-3,6-dihydro-thiazine-3-acetic acid, were recovered. This material after extraction with ethanol and recrystallizing from chloroform had a melting point of 178° C. to 179° C. A chemical analysis of this product gave the percentage composition as tabulated below which is in close agreement with the calculated composition for the above-named compound.

*Percentage composition*

| Calculated | By Analysis |
|---|---|
| C_____ 54.11 | C_____ 54.29 |
| H_____ 4.54 | H_____ 4.46 |
| N_____ 5.26 | N_____ 5.23 |

The reactions illustrated above as well as the reactions between other dithiocarbamic acids of amino acids and esters can be carried out at temperatures other than 60° C. Reaction will take place at room temperature (about 25° C.) or less but the reaction rate is slow. The reaction can also be carried out at temperatures above 60° C. but excessive heating will result in the decomposition of the dithiocarbamic acid. The useful range of temperature for the reaction is from about 20° C. to about 100° C. with the preferred temperature range being from about 50° C. to about 75° C.

Any of the unsaturated aldehydes and ketones hereinbefore named can be substituted for mesityl oxide of Example II or cinnamaldehyde of Example III to prepare other 2-thiono-thiazine-3-monocarboxylic acids and esters of this invention. Also the dithiocarbamic acid derivatives of the hereinbefore named amino acids and esters can be substituted for the dithiocarbamic acid derivative of glycine (amino acetic acid) employed in Examples II and III to prepare other 2-thiono-thiazine-3-monocarboxylic acids and esters of this invention.

The following examples in tabular form illustrate the use of other aldehydes, ketones, dithiocarbamic acid derivatives of amino acids and esters and the resulting 3-substituted-2-thionothiazines of this invention.

EXAMPLES IV to XII

| | Unsaturated Aldehyde or Ketone Used | Amino Acid Whose Dithiocarbamic Acid Derivative is Used | Product |
|---|---|---|---|
| IV | $CH_2=CH-\overset{O}{\underset{\|}{C}}-H$ <br> Acrolein | $H_2NCH_2CH_2COOH$ <br> beta alanine | 2-thiono-3,6-dihydrothiazine-3-propionic acid |
| V | $C_3H_7-\overset{H}{\underset{C_2H_5}{C}}=\overset{O}{\underset{\|}{C}}-H$ <br> 2-ethylhexenal | $H_2N\text{-}C_6H_4\text{-}COOH$ <br> p-amino benzoic acid | 6-ethyl-6-n-propyl-2-thiono-3,6-dihydro-thiazine-3-p-benzoic acid |
| VI | $CH_2=\overset{O}{\underset{C_3H_7}{C}}-\overset{\|}{C}-H$ <br> alpha-propyl acrolein | $H_2N\text{-}C_6H_4\text{-}C(=O)\text{-}OC_4H_9$ <br> Butesin | 5-n-propyl-2-thiono-3,6-dihydro-thiazine-3-p-benzoic acids butyl ester |
| VII | $CH_2=CH-\overset{O}{\underset{\|}{C}}-CH_3$ <br> Methyl vinyl ketone | $CH_3CH_2-\overset{C_2H_5}{\underset{NH_2}{C}}\overset{O}{-}C\text{-}OH$ <br> 1-amino-1-ethyl butyric acid | 4-methyl-2-thiono-3,6-dihydro-thiazine-3-αα-diethyl acetic acid |
| VIII | $CH_2=C-\overset{O}{\underset{\|}{C}}-C_6H_5$ <br> Phenyl vinyl ketone | $CH_3CH_2CH_2\overset{O}{\underset{NH_2}{C}}-OH$ <br> 3-amino butyric acid | 4-phenyl-2-thiono-3,6-dihydro-thiazine-3-butyric acid |

EXAMPLES IV to XII—Continued

| | Unsaturated Aldehyde or Ketone Used | Amino Acid Whose Dithiocarbamic Acid Derivative is Used | Product |
|---|---|---|---|
| IX | Benzylidene acetone | 5-amino caproic acid | 4-methyl-6-phenyl-2-thiono-3,6-dihydro-thiazine-3-caproic acid |
| X | Chalcone | glycine | 4,6-diphenyl-2-thiono-3,6-dihydro-thiazine-3-acetic acid |
| XI | Styryl n-hexyl ketone | glycine | 4-n-hexyl-6-phenyl-3-thiono-3,6-dihydro-thiazine-3-acetic acid |
| XII | 5-methyl-4-heptene-one-3 | glycine | 6-methyl-4,6-diethyl-3-thiono-3,6-dihydro-thiazine-3-acetic acid |

Having disclosed our invention by way of specific examples which are intended merely to be illustrative of our process and the products obtained thereby and which are not to be construed as limitations thereon, we do not desire or intend to limit ourselves solely thereto, for as hitherto stated the proportions of the materials utilized and the reaction conditions may be varied and chemical equivalent compounds may be used, if desired, without departing from the spirit and scope of our invention as defined in the appended claims.

We claim:

1. A compound having the formula

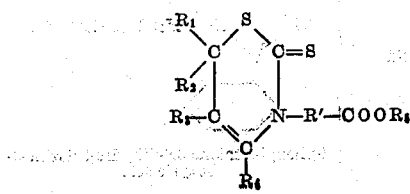

where each of $R_1$, $R_2$, $R_3$, $R_4$ and $R_5$ is a member selected from the group consisting of hydrogen and hydrocarbon radicals and R' is a divalent hydrocarbon group.

2. 4,6,6 - trimethyl-2-thiono-3,6-dihydro-thiazine-3-acetic acid having the formula

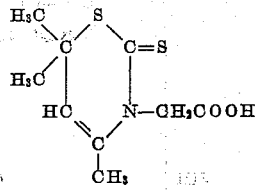

3. 6-phenyl-2-thiono - 3,4 - dihydro - thiazine-3-acetic acid having the formula

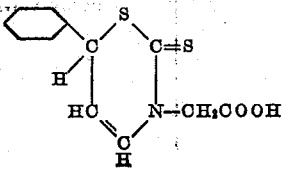

4. A 2-thiono-thiazine-3-acetic acid having the formula

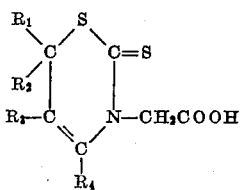

where $R_1$, $R_2$, $R_3$ and $R_4$ are members selected from the group consisting of hydrogen and hydrocarbon groups.

5. The method of preparing 3-substituted-2-thiono-thiazines which comprises reacting an alpha-beta-unsaturated carbonyl compound of the formula

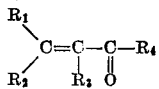

wherein each of $R_1$, $R_2$, $R_3$ and $R_4$ is a member of the group consisting of hydrogen and hydrocarbon radicals with a salt of a dithiocarbamic acid of the formula

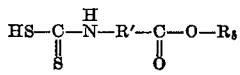

wherein $R_5$ is a member of the group consisting of hydrogen groups and $R'$ is a divalent hydrocarbon radical, in an acidic aqueous medium at a temperature of 20 to 100° C. and recovering from the reaction medium a compound of the formula

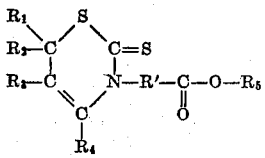

wherein $R_1$, $R_2$, $R_3$, $R_4$, $R_5$ and $R'$ have the same significance as indicated above.

ROGER A. MATHES.
FLOYD D. STEWART.

REFERENCES CITED

The following references are of record in the file of this patent:

UNITED STATES PATENTS

| Number | Name | Date |
|---|---|---|
| 2,086,186 | Messer | July 6, 1937 |
| 2,466,396 | Dickey | Apr. 5, 1949 |

Certificate of Correction

Patent No. 2,514,004                                                                July 4, 1950

ROGER A. MATHES ET AL.

It is hereby certified that error appears in the printed specification of the above numbered patent requiring correction as follows:

Column 3, lines 57 to 59, for that portion of the formula reading

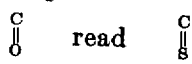

column 4, lines 66 to 68, for

columns 5 and 6, Example VII, first column thereof, in the formula, for

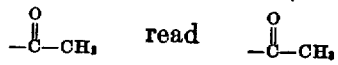

column 10, line 2, after the word "hydrogen" insert *and hydrocarbon*;

and that the said Letters Patent should be read as corrected above, so that the same may conform to the record of the case in the Patent Office.

Signed and sealed this 17th day of October, A. D. 1950.

[SEAL]

THOMAS F. MURPHY,
                                                                      *Assistant Commissioner of Patents.*